United States Patent
Kinsell

[15] 3,699,700
[45] Oct. 24, 1972

[54] MINNOW SEINE POLES
[72] Inventor: Earl G. Kinsell, P.O. Box 164, Millsboro, Pa. 15348
[22] Filed: Dec. 31, 1970
[21] Appl. No.: 103,139

[52] U.S. Cl. .................................................. 43/14
[51] Int. Cl. .............................................. A01k 73/12
[58] Field of Search......... 43/7, 10, 11, 12, 14, 42.29, 43/4, 1

[56] References Cited

UNITED STATES PATENTS 2,553,980  5/1951  Ostrander ..................... 43/14
2,132,760  10/1938  Reekers ..................... 43/42.29
2,203,827  6/1940  Kors ............................. 43/14

Primary Examiner—Warner H. Camp
Attorney—Clarence A. O'Brien and Harvey B. Jacobson

[57] ABSTRACT

A seine net is spread between two spaced parallel poles whose rearward ends provide appropriate handles. The marginal side portions of the net are provided with an attached line which is releasably connected to the poles by resilient adapter clips.

2 Claims, 3 Drawing Figures

PATENTED OCT 24 1972   3,699,700

Earl G. Kinsell
INVENTOR.

BY Clarence A. O'Brien
and Harvey B. Jacobson
Attorneys

MINNOW SEINE POLES

The present invention relates to that classification of fishing gear which is analogous, generally stated, to encompassing and scooping nets and has to do, more particularly, with an adaptation which lends itself to feasible and acceptable use by a walking attendant and which can be slanted into the water in front of the user and can be manipulated by pushing and proper handling to catch and land minnows of the various species.

As the introductory statement of the invention sets forth the concept pertains to a relatively small seine or net which is approximately four feet square and wherein the left and right marginal edges are detachably linked to adapters which are mounted on a pair of manually maneuverable poles.

Briefly, the net is not only of requisite size, weight and mesh it lends itself to two-handed use by the user. To the ends desired it comprises a pair of like elongated spaced parallel poles having forward leading ends and rearward trailing ends and wherein the rearward ends provide appropriate handles or hand grips. A collapsible and spreadable net or seine is appropriately stretched between the respective poles and has self-contained facilities for entrapment of minnows. The net spans the space between the poles and comprises a body portion whose marginal edges are tied to a frame-like net encompassing line, that is, line means which embodies a rearward cork line having floats attached thereto, a forward lead line having weighted leads mounted thereon and a pair of complemental side lines. The side lines are inwardly of the respective poles and adapter means is provided on the poles to which the coacting side lines are releasably hitched.

More specifically, novelty is predicated on the adapters which are mounted at longitudinally spaced points on the poles, the adapters being anchored atop the respective poles at longitudinally spaced points. In fact, each adapter is characterized by a line attaching clip or link. An outer end of the link is riveted or otherwise anchored on a surface of the oriented pole. An inner end of the link is provided with hook means which is so constructed and arranged as to allow that portion of the side line which is adjacent thereto to be detachably clipped to the hook means.

Persons conversant with the art to which the invention relates are aware that various portable surf fishing nets are known but are comparatively complicated and expensive, for which reason it is an object of the present invention to provide a net or seine construction which lends itself to appropriate use for scooping up and gathering minnows.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
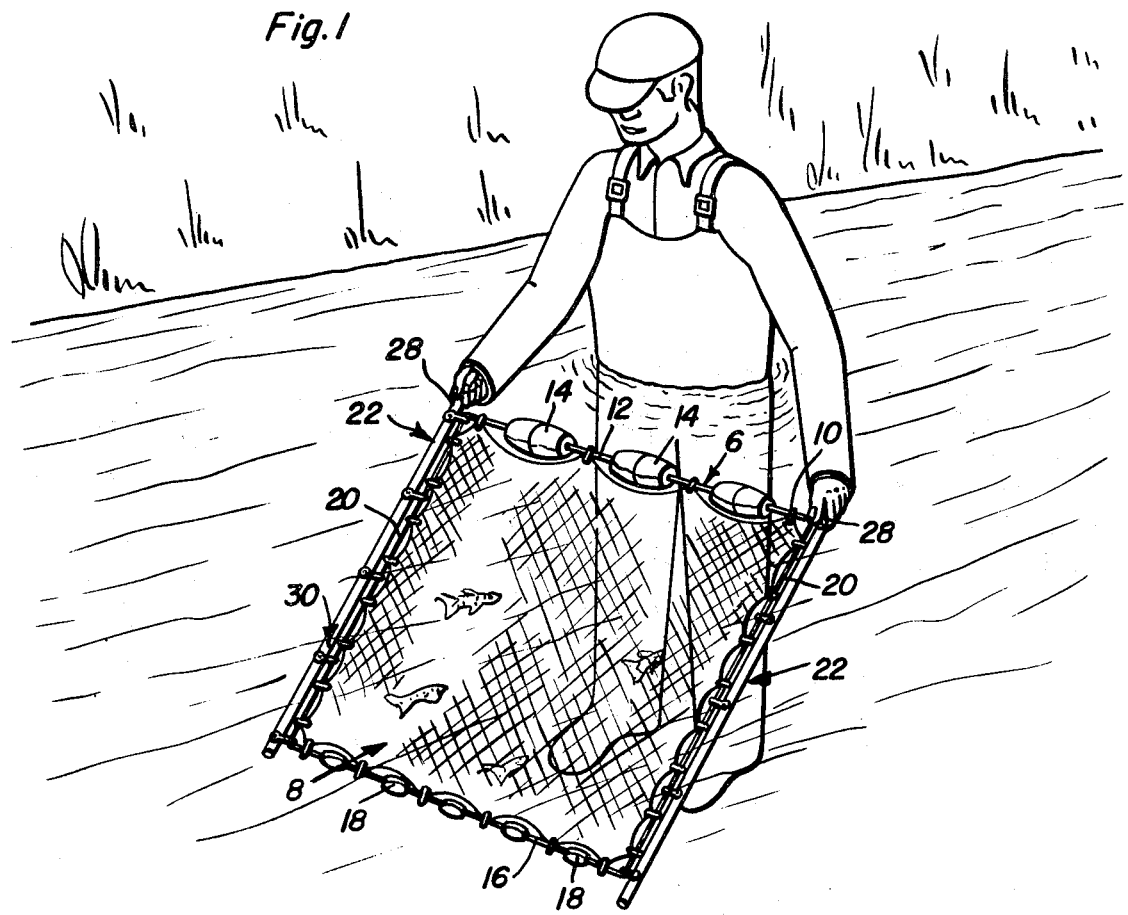
FIG. 1 is a view in perspective of a minnow seine scooping implement characterized by the aforementioned paired poles and the insertable and removable net or seine hitched and supported between the poles.
Figure 2:
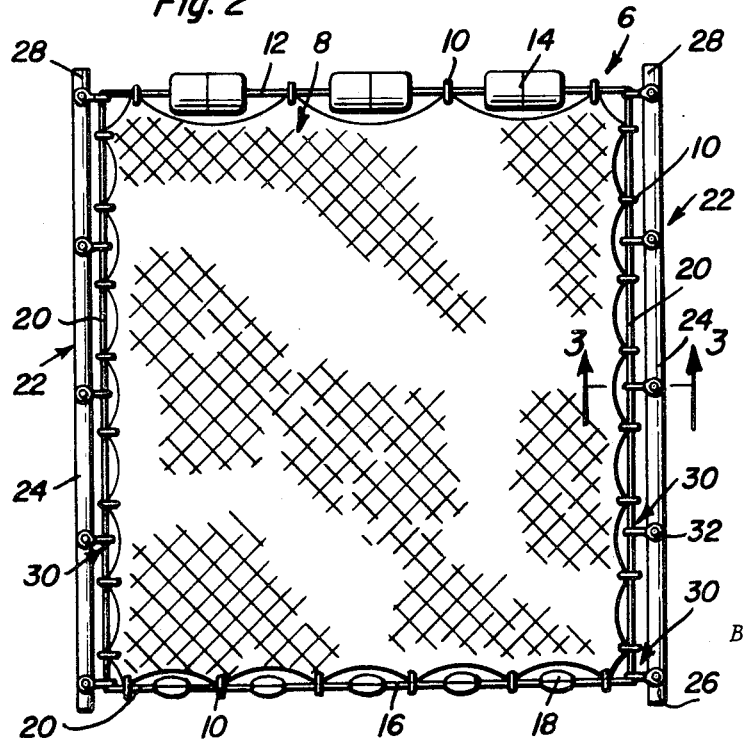
FIG. 2 is a top plan view of the minnow seine on a slightly enlarged scale.
Figure 3:
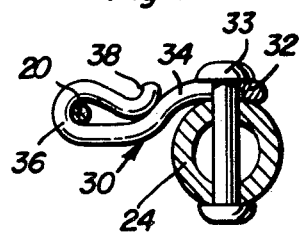
FIG. 3 is a section on an enlarged scale taken approximately on the plane of the section line 3—3 of FIG. 2 looking in the direction of the indicating arrows.

It is a matter of common knowledge that many and varying fishing seines have to do with a net which is expressly fabricated to provide the desired mesh and entrapping features. Generally stated, a net in this field of invention is usually thought of as embodying a body portion, an upper edge constituting a cork line provided with floats, and a lower leading marginal edge referred to as a lead line and provided with suitably spaced and proportioned weights or leads. The fact that the present invention is designed and adapted for use by a single user and keeping in mind certain state laws and requirements the net or seine proper is approximately 4 feet square. The overall structure including the net and poles, construed as an implement, is denoted by the numeral 6. It comprises an appropriately fabricated net the body portion of which is denoted at 8 and is square in plan as shown in FIGS. 1 and 2. This net is encompassed by line means to which the marginal edges of the net are tied or otherwise connected as at 10. The means comprises a so-called cork line 12 having appropriate floats mounted thereon as at 14. The lower or bottom line, commonly referred to in the trade as the lead line is denoted at 16 and is provided with suitably spaced and constructed weights or leads 18. In this instance the side lines are significant in that they perform a special function in the disclosure herein under consideration and the left and right side lines are shown in FIG. 2 and are denoted at 20. It is these lines which are arranged inwardly of and detachably connected to the surrounding hand-held and manipulated poles, that is, the two correspondingly constructed hollow or equivalent poles 22. The pole proper is denoted at 24. The forward or leading ends of the poles are denoted at 26 and in practice are sloped and dipped into the water in the manner suggested in FIG. 1. The upper end portions are appropriately constructed and may be provided with suitable handle means which is denoted generally stated as at 28. The seine or net is positioned between the respective inner longitudinal edges of the poles and the side lines 20 are detachably connected to the poles. The hitching or connecting means in each instance is the same and is detailed in FIG. 3. This means comprises a connector which is also called an adapter and is, more specifically, a link 30. This link is provided at an outer end with an eye 32 which is superimposed upon the top of the pole and is riveted thereto as at 33. The rivet shown in FIG. 3 is merely one style or type and in an actual practice so-called pop rivets (not illustrated) can be used. In any event, the link has a portion 34 which projects inwardly of the pole and is bent upon itself as at 36 to provide a hook. The bill portion of the hook is denoted at 38 and is suitably resilient and arranged to permit a portion of the side line 20 to be snapped into position and thus detachably held in place.

The details of construction of the overall portable one-man-type seine are believed to be adequately shown in the several views of the drawing and the manner of scooping push-along use is adequately illustrated in FIG. 1. Accordingly, a more extended description of the invention is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable minnow gathering, scooping and handling seine for manual use comprising: a pair of like elongated spaced parallel poles having forward leading ends and rearward trailing hand-held ends, a spreadable net having prescribed meshes suitable for entrapment of minnows, said net spanning the space between said poles, said net comprising a body portion whose marginal edges are tied to net encompassing line means embodying a rearward cork line having floats attached thereto, a forward lead line having weighted leads mounted thereon and a pair of complemental side lines inwardly of and substantially parallel with their respectively cooperable poles, and adapters located at equidistant points on the respective poles and to which the coacting side lines are releasably hitched, each adapter comprising a connecting link for an adjacent portion of a coordinating part of the coacting side line, said link having an outer end provided with an eye riveted and anchored on a peripheral surface of the oriented pole and an inner projecting end provided with a terminal resilient hook with which a cooperating portion of the adjacent side line is hitched and detachably held in place.

2. A single user, minnow gathering, scooping and handling seine for portable hand supported push-along scooping use comprising, a pair of like light weight but rigid poles having exposed forward leading ends and rearward grippable handling ends, a plurality of spaced equidistant longitudinally spaced adapter links, said links having outer bent ends individually superimposed and anchored on the cooperating surface portions of the respective poles, each link having an inwardly extending portion terminating in a resilient snap-type net attaching and supporting hook, an insertable and removable relatively small net of fabricated mesh, said net having a marginal line including side lines which are spaced inwardly from and parallel to the respective poles, said lines being detachably connected and hitched to the respectively cooperable poles by way of hook portions of the respectively cooperable hooks and links.

* * * * *